S. BERNHEISEL.
GRAIN DRIER.
No. 14,181. Patented Feb. 5, 1856.
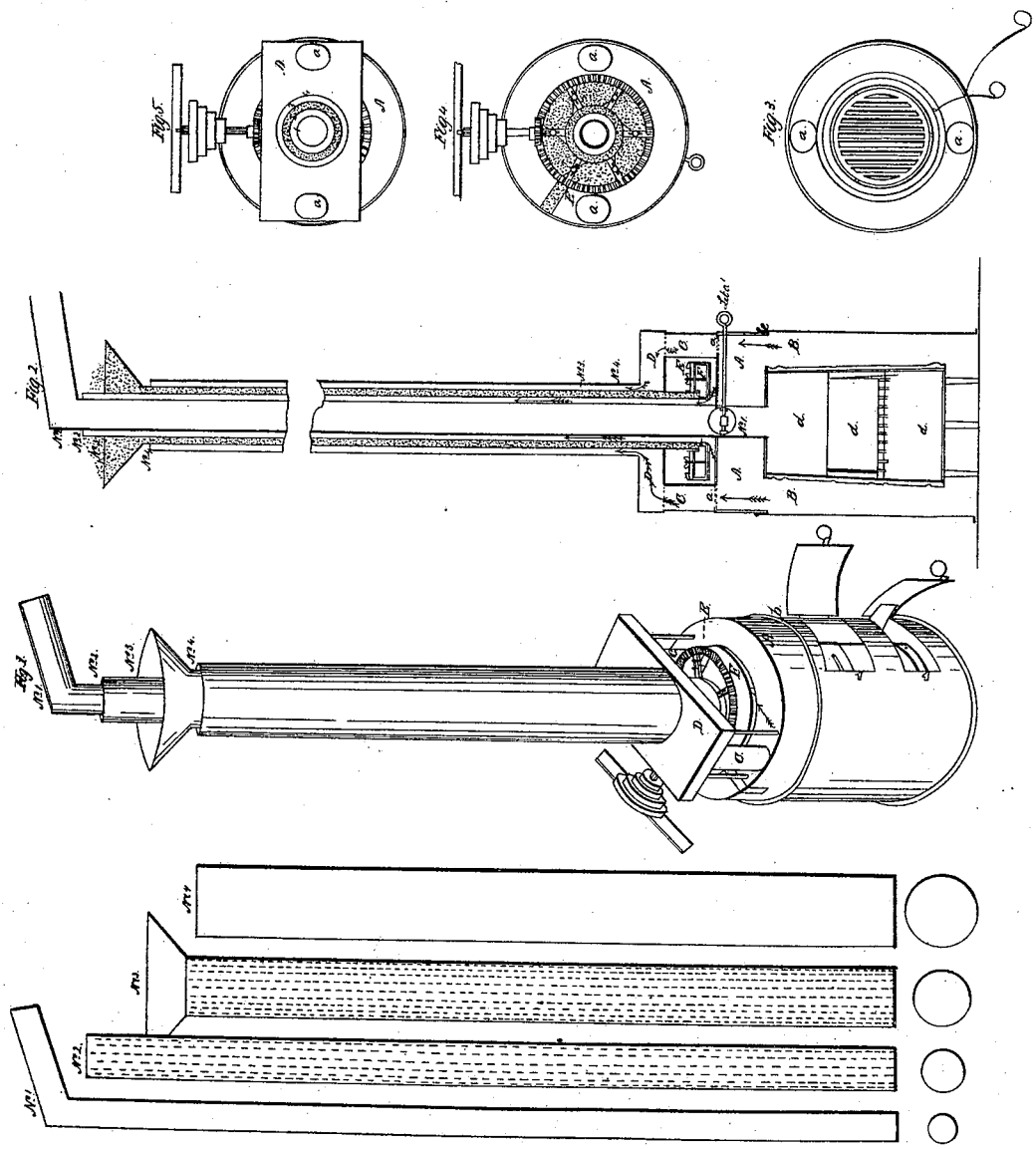

UNITED STATES PATENT OFFICE.

SOLOMON BERNHEISEL, OF TYRONE TOWNSHIP, PENNSYLVANIA.

CORN-DRIER.

Specification of Letters Patent No. 14,181, dated February 5, 1856.

*To all whom it may concern:*

Be it known that I, SOLOMON BERNHEISEL, of Tyrone township, in the county of Perry and State of Pennsylvania, have invented certain new and original Improvements in Kilns for Drying Corn or Grain; and I do hereby declare that the following is a full, clear, and exact description of the same, reference being had to the accompanying drawings, making a part of this specification.

The nature of my invention consists in bringing the heated air from a suitable furnace in contact with a stream of shelled corn, passing down pipes furnished with perforations, so that moisture in the grain (in the form of steam) may be passed by pipes exterior and interior to the aforesaid pipes as well as through the stream of corn; thus by means of the heated air between the inside pipe (an ordinary smoke pipe) and the inside perforated pipe, the heat may have its full effect on the grain without danger of being burned, as the cold air received at the bottom of the perforated pipe counteracts this evil. By means of the second perforated pipe, moisture is permitted to escape between it and an outer pipe or casing, and it is between these pipes the heated air from a chamber above and surrounding the furnace is passed; thus not only heating the corn but carrying off the moisture therefrom without the necessity of the corn lying until it has gone through a sweat.

To enable others skilled in the art to make and use my improvement I would describe it as follows: On the top of an ordinary common stove $d$ I place a cast or wrought iron chamber A, A. This chamber communicates by holes $a$ $a$ with a chamber B surrounding the stove. The pipe designated as No. 1, serves the purpose of a smoke pipe and passes through the chamber A, being attached to the stove by a tight joint.

$c$ $c$ represent two short tubes forming a communication between the air chamber A, and an upper chamber D. This second chamber has the outside tight pipe No. 4, attached by a tight joint to the upper side thereof for the purpose of conveying the hot air.

Pipe designated No. 3, instead of being solid like those described is perforated in its walls, the holes of such size as will prevent the passage of the grains of shelled corn; it is by a suitable collar attached to the lower side of the second chamber, being extended below it, and through a revolving wheel called a hopper boy E, and reaches within a short distance of the hopper F. The space between the end of pipe 3 and the floor of the hopper serves to pass the grain to the hopper boy. The hopper itself instead of being immediately on the chamber, is raised a short distance above it, so as to allow the air to pass under the hopper F and between the pipes as before described.

The pipe designated No. 2 is like No. 3, a perforated pipe; it passes through the hopper boy E, and is attached to a collar on the upper side of hopper F. At the upper portions of these pipes a hopper for the reception of the moist corn is placed, and so arranged that the grain on being passed through the space between the perforated pipes 2 and 3, shall be subjected to the action of heat from space between Nos. 1 and 2 and the space between Nos. 3 and 4 as it falls into the hopper F from which it is thrown by the revolution of the hopper boy E into the delivering spout of the hopper.

Having described my improvements in kilns or corn driers what I claim as my invention and desire to secure by Letters Patent is—

The perforated pipes Nos. 2 and 3 in combination with the hopper placed above the hot air chamber A as described, so as to allow the air to pass between the inner perforated pipe and the smoke pipe, while the hot air from chamber D passes up between the outer perforated pipe and the exterior pipe or casing $o$ substantially in the manner and for the purposes set forth.

SOLOMON BERNHEISEL.

Witnesses:
JACOB BERNHEISEL,
WM. SLICER.